Dec. 20, 1927.
H. J. SEVIGNY
OIL GAUGE ROD WIPER
Filed April 11, 1927
1,653,315
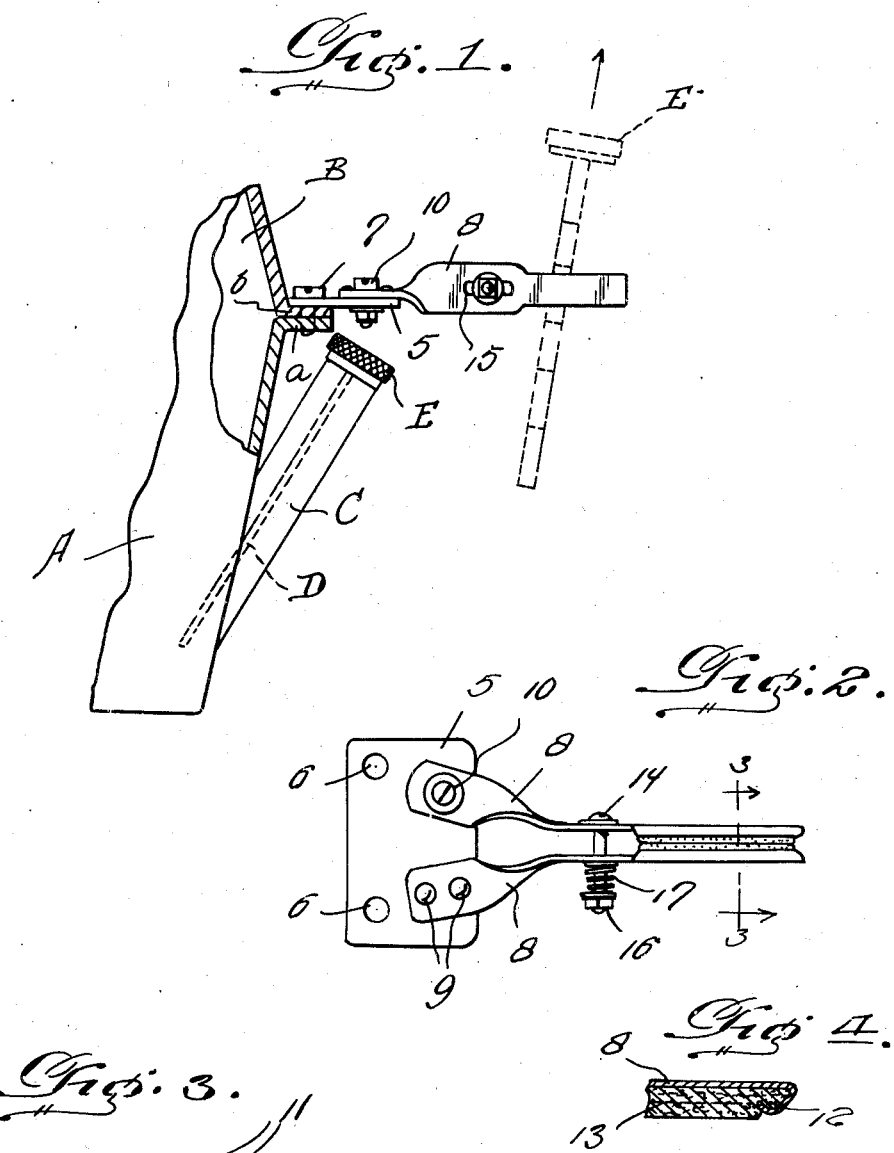
Inventor
H. J. Sevigny,
By Clarence A. O'Brien
Attorney Patented Dec. 20, 1927.

1,653,315

UNITED STATES PATENT OFFICE.

HOLLIS J. SEVIGNY, OF SANFORD, MAINE.

OIL-GAUGE-ROD WIPER.

Application filed April 11, 1927. Serial No. 182,979.

This invention relates generally to automobile engine oil gauges of the character including an upwardly inclining tube at the side of the engine crank case and within which is engaged a level gauge rod, the invention having more particular reference to a wiping device, attached to the engine, directly adjacent the gauge for facilitating the wiping of the rod, which is generally necessary in taking the proper gauge of the oil within the crank case.

In carrying out my invention, there is provided a highly novel, simple and inexpensive construction that may be readily attached to the automobile engine or at any other convenient point, and through which the gauge rod may be easily drawn so as to clean the same.

One of the primary objects of the invention is to provide a wiper of this character, that includes a pair of spring pressed fingers, normally maintained in contact, and upon the inner faces of which are arranged wiping strips between which the gauge rod is adapted to be drawn, said spring fingers permitting gauge rods of various thicknesses to be readily passed therethrough.

In the drawing:

Figure 1 is a fragmentary view, partly in elevation, and partly in cross section, of an engine crank case and block, the crank case thereof being equipped with an upwardly inclined oil tube, in which is disposed a conventional gauge rod, and above which is arranged a wiper constructed in accordance with the present invention, the rod being disclosed in dotted lines between the spring fingers of the device, Figure 2 is a top plan view of the wiper per se, Figure 3 is a transverse section, taken substantially upon the line 3—3 of Figure 2, for more clearly disclosing the association of the wiping strip with the spring fingers, and Figure 4 is a fragmentary longitudinal section through the outer end of one of the fingers and its associated wiping strip for disclosing the manner of association of the strip with the spring finger at the outer end thereof.

Now having particular reference to the drawing, A designates fragmentarily the crank case of an automobile engine, while B designates the block thereof, said block and crank case being flanged as at $a$ and $b$, so as to facilitate the attachment of the same. Extending upwardly from one side of the crank case A is an oil gauge tube C, within which is disposed a gauge rod D, disclosed in dotted lines, upon the upper end of which is a knob E. My improved invention consists of a suitable attaching plate 5, that may be secured to the flange of the motor block B, adjacent the gauge tube C, the same being provided with openings 6—6 to facilitate the attachment of the same to the flange by screws or other fastening means 7. The invention further consists of a pair of narrow metallic fingers 8—8 extending outwardly from the plate 5, one of the fingers being riveted to the plate as at 9, while the other finger is preferably pivoted thereto as at 10. Outwardly of the plate 5, the material forming these fingers 8—8 is twisted at right angles to the inner ends thereof, so that flat opposing faces will be provided. At the extreme outer ends of these fingers 8—8, the same are flanged at their edges and ends as at 11—11 and 12, while arranged upon the opposed faces of the fingers are strips of suitable wiping material 13—13, arranged between the side flanges 11—11, the end flanges 12 of the fingers being bent inwardly for biting engagement into the ends of the strips of wiping material, as clearly indicated in Figure 4.

Arranged through an opening in one of the fingers 8, inwardly of the wiping strip 13 is a headed and threaded screw 14, the threaded end of which projects through a longitudinal slot 15, in the opposite finger 8, as indicated in Figure 1. Upon the threaded end of the screw is arranged a nut 16. Surrounding the screw between the nut and the adjacent finger 8 is an expansible coil spring 17 for the purpose of maintaining the wiping strips 13—13 of the fingers in tight engagement, but yet permitting the gauge rod D to be forcibly engaged therebetween so that by drawing the same therethrough it will be thoroughly cleaned. By reason of the spring 17, these wiping strips 13—13 are held in frictional contact with the gauge rod, and this regardless of the diameter thereof.

It will thus be seen that I have provided a highly novel, simple and efficient oil gauge rod wiper for automobile engine gauges, that is well adapted for all of the purposes heretofore designated, and even though I have herein shown and described the invention, as consisting of certain detail structural elements, it is nevertheless to be understood that some changes may be made therein without affecting the spirit and scope of the appended claims.

Having thus described my invention, what I claim as new is:

1. In an oil gauge rod wiper of the character described, an attaching plate, a pair of metallic fingers secured at their inner ends to the plate in spaced relation, one of said fingers being pivoted to the plate, wiping material strips arranged upon the opposed faces of the fingers at the outer ends thereof, and means arranged through the fingers for causing the tight yieldable engagement of the opposed wiping strips.

2. In an oil gauge rod wiper of the character described, an attaching plate, a pair of metallic fingers secured at their inner ends to the plate in spaced relation, one of said fingers being pivoted to the plate, strips of wiping material arranged upon the opposed faces of the fingers at the outer ends thereof, means arranged through the fingers for causing the tight yieldable engagement of the opposed wiping strips, the longitudinal and end edges of the fingers within the confines of the strips of wiping material being flanged over the longitudinal and outer end edges of the strips of wiping material, the end flanges of the fingers being bent into engagement with the ends of the said strips of wiping material.

3. In an oil gauge rod wiper of the character described, an attaching plate, a pair of horizontally extending metallic fingers secured at their inner ends to the plate, a pivotal connection affording the securing means between the plate and one of the fingers, strips of wiping material arranged on the opposed faces of the fingers, and a headed and threaded screw arranged transversely through openings in the fingers, and a nut upon the outer threaded end of the screw and an expansible spring arranged over the screw between the adjacent finger and the nut for causing the forced yieldable engagement of the strips of wiping material.

4. In a device of the class described, a pair of metallic fingers, a plate forming a common attaching means for the fingers, said fingers being arranged for spacing movement therebetween, spring tension means adapted to urge the outer ends of the fingers in closed relation, and a lining of wiping material carried on the opposed faces of said fingers between which a rod may be drawn whereby to remove any foreign matter adhering thereto.

5. In an oil gauge rod wiper, an attaching plate, a pair of wiping element supports arranged in parallel relation and attached at one end to said plate, one of said supports being fixedly attached and the other support being pivotally attached, means arranged intermediate the ends of the support for yieldably connecting the same providing for spacing movement at the free ends thereof and wiping elements carried by the opposed faces of said supports at the free ends thereof.

In testimony whereof I affix my signature.

HOLLIS J. SEVIGNY.